J. STOKES, Jr.
TRACE FASTENER.
APPLICATION FILED OCT. 17, 1912.
1,065,632.
Patented June 24, 1913.
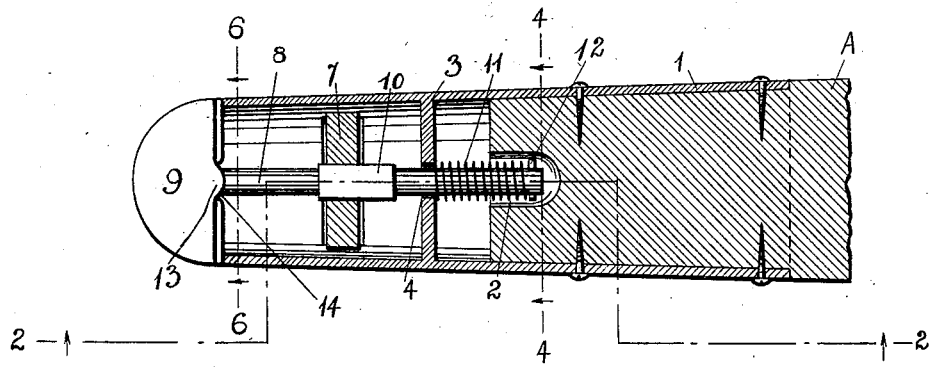
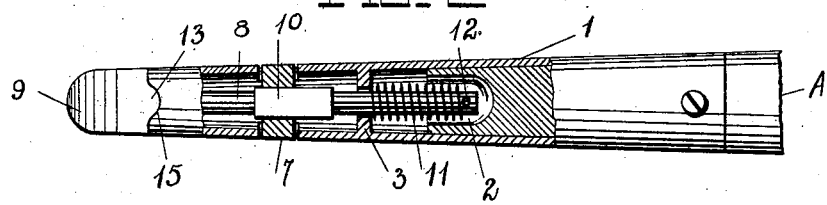
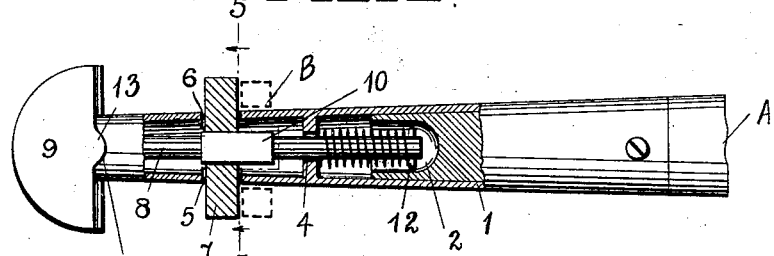
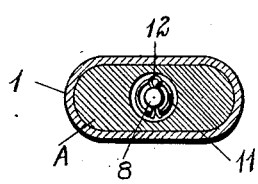
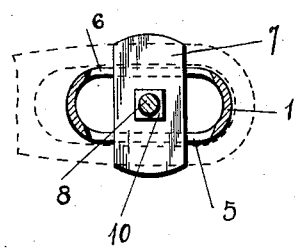
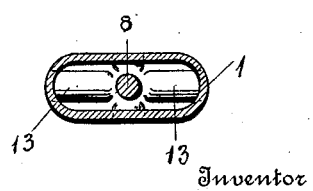
Inventor
J. Stokes, Jr.
Witnesses
E. D. Haines
J. M. McColl
By H. B. Willson & Co.
Attorneys

UNITED STATES PATENT OFFICE.

JEREMIAH STOKES, JR., OF SALT LAKE CITY, UTAH.

TRACE-FASTENER.

1,065,632.  Specification of Letters Patent.  Patented June 24, 1913.

Application filed October 17, 1912. Serial No. 726,292.

*To all whom it may concern:*

Be it known that I, JEREMIAH STOKES, Jr., a citizen of the United States, residing at Salt Lake City, in the county of Salt Lake and State of Utah, have invented certain new and useful Improvements in Trace-Fasteners; and I do declare the following to be a full, clear, and exact description of the invention, such as will enable others skilled in the art to which it appertains to make and use the same.

This invention relates to trace fasteners for whiffle-trees.

The object of the invention is to provide a simple and efficient device of this character which may be readily connected with a whiffle-tree and which will effectually prevent the trace from becoming disengaged from the whiffle-tree.

With this and other objects in view, the invention consists of certain novel features of construction, and the combination and arrangement of parts as will be more fully described and claimed.

In the accompanying drawing; Figure 1 represents a longitudinal section of one end of a whiffle-tree provided with this improved fastener; Fig. 2 is a similar view taken in a plane at right angles to that shown in Fig. 1 and on the line 2—2 of Fig. 1 with the parts in position to receive the trace; Fig. 3 is a side elevation partly in longitudinal section showing the trace holding element in open position and the trace in dotted lines; Fig. 4 is a transverse section taken on the line 4—4 of Fig. 1; Fig. 5 is a similar view taken on the line 5—5 of Fig. 3; Fig. 6 is a similar view taken on the line 6—6 of Fig. 1.

In the embodiment illustrated a casing 1 is shown preferably oval in cross section and tapering toward one end, the larger end of said casing being designed to receive one end of a whiffle-tree A and be connected thereto by means of suitable fastening elements. The ends of the whiffle-tree A are recessed as shown at 2 for a purpose to be described.

The casing 1 has a transverse partition 3 arranged about midway its length which is provided with an aperture 4 for a purpose to be described. This casing 1 is provided in its opposite flat faces at a point near its outer end with openings 5 and 6 within which a trace fastening element 7 is adapted to operate, said element 7 being housed within the casing when in inoperative position and projecting beyond opposite sides thereof through the openings 5 and 6 when in operative position to hold a trace B on the whiffle-tree as shown clearly in Fig. 3.

A shaft 8 provided at its outer end with a guiding thumb piece or button 9 is inserted in the casing 1 and passes through the aperture 4 in the partition 3 thereof with its inner end projecting into the recess 2 in the end of the whiffle-tree. This shaft 8 has an angular portion 10 intermediate of its ends which is adapted to extend through a correspondingly shaped opening in the trace holding element 7, whereby said element is held on said shaft and adapted to be turned therewith. A coiled spring 11 encircles the inner end of the shaft 8 and bears at one end against the partition 3 and at its other end against a pin 12 which extends transversely through the inner end of said shaft, said spring being designed to hold the shaft in operative or inoperative position. The thumb piece 9 which projects beyond the end of the casing has lugs 13 arranged at its opposite sides which are adapted to engage recesses 14 and 15 formed in the outer end of the casing 1 in the flat side walls thereof and in the narrow end walls respectively, said lugs being held in these recesses by the spring 11.

In the use of this fastener the thumb piece 9 is turned in the position shown in Figs. 1 and 2 whereby the trace engaging element or cross bar 7 is housed within the casing 1 thereby presenting a smooth unobstructed surface at the end of the whiffle-tree for the insertion of the eye or loop of the trace. After the trace has passed beyond the element 7, said thumb piece 9 is drawn longitudinally outward against the tension of the spring 11 and turned halfway around thereby causing the ends of the cross bar and the trace engaging element 7 to project through the openings 5 and 6 in the casing 1 and extend a sufficient distance to hold the trace against disengagement from the whiffle-tree. When in this position the lugs 13 of the thumb piece 9 engage the recesses 15 in the ends of the casing 1 and the spring exerts its tension to hold said member in this position and thereby lock the element 7 into engagement with the trace.

While I have described my invention with more or less minuteness as regards details and as being embodied in certain precise forms, I do not desire to be limited thereto unduly any more than is pointed out in the claims. On the contrary, I contemplate all proper changes in form, construction and arrangement, the omission of immaterial elements and substitution of equivalents as circumstances may suggest or render expedient.

I claim as my invention:

1. A trace fastener for whiffle-trees comprising a casing having oppositely disposed openings in the side walls thereof, a rotary member mounted in said casing, and a trace engaging element on said member adapted to be projected through the openings in the casing on the turning of said member in one direction and to be housed within the casing on the turning of said member in the opposite direction.

2. A trace fastener for whiffle-trees comprising a casing having openings in its side walls, a shaft slidable longitudinally in said casing, resilient means for retaining said shaft within the casing, a trace engaging element mounted on said shaft within the casing and adapted to project beyond the outer face of the casing on the turning of the shaft in one direction and to be housed within the casing on the turning of the shaft in the other direction.

3. A trace fastener for whiffle-trees comprising a casing having openings in its side walls, a shaft slidable longitudinally in said casing, resilient means for retaining said shaft within the casing, a trace engaging element mounted on said shaft within the casing and adapted to project beyond the outer face of the casing on the turning of the shaft in one direction and to be housed within the casing on the turning of the shaft in the other direction, a thumb piece on said shaft, and coöperating means on said thumb piece and casing for holding the shaft in adjusted position.

4. A trace fastener for whiffle-trees comprising a casing having an apertured transverse partition therein and openings in its side walls, a shaft rotatably and slidably mounted in said casing and extending through the aperture in the partition thereof, a coiled spring on said shaft beyond said partition, means for holding said spring in working position, a trace engaging element mounted on said shaft within said casing and adapted to project beyond the outer face of the casing on the turning of the shaft in one direction and actuating means for said shaft on its outer end.

In testimony whereof I have hereunto set my hand in presence of two subscribing witnesses.

JEREMIAH STOKES, Jr.

Witnesses:
ElIZABETH BOYES,
F. J. RUSHTON.

---

Copies of this patent may be obtained for five cents each, by addressing the "Commissioner of Patents, Washington, D. C."